Sept. 25, 1934. M. J. DEMPSEY 1,974,807
COMPOUND TOOL AND METHOD OF MAKING THE SAME
Filed Jan. 28, 1933
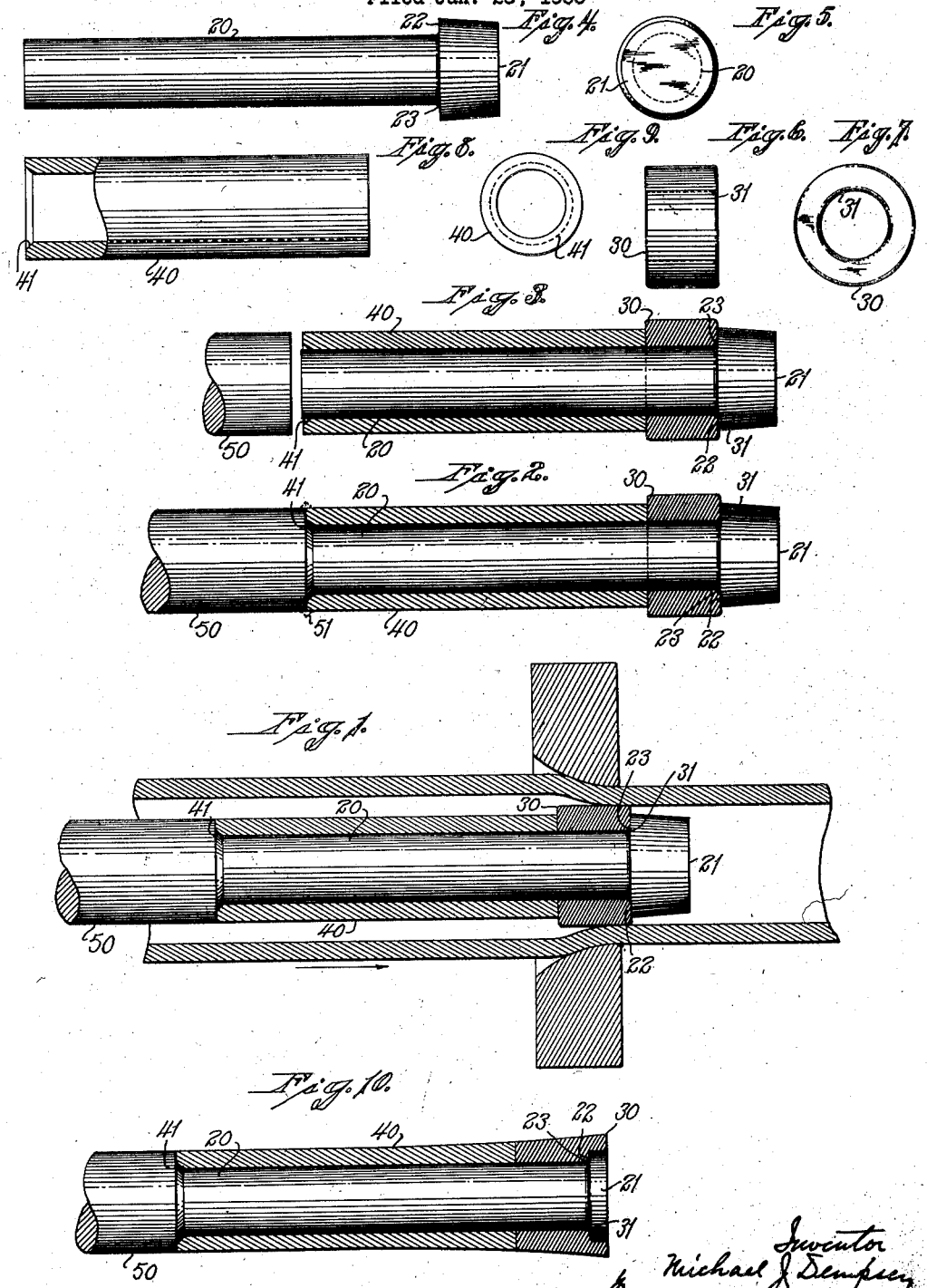

Patented Sept. 25, 1934

1,974,807

UNITED STATES PATENT OFFICE 1,974,807

COMPOUND TOOL AND METHOD OF MAKING THE SAME

Michael J. Dempsey, Waterbury, Conn., assignor to The Chase Companies, Incorporated, Waterbury, Conn., a corporation Application January 28, 1933, Serial No. 653,975

5 Claims. (Cl. 76—107)

This invention relates to compound tools and a method of making the same and more particularly to tools such as punches and drawing plugs comprising a working element of hard and relatively brittle material mounted on a supporting and actuating element of softer and tougher material.

An object of the invention is to produce a tool of the character described having improved durability and capable of turning out work with closer tolerance than heretofore.

One embodiment of the invention contemplates producing an improved drawing plug for drawing seamless metal tubing by forming a cylindrical core member of tough and durable steel having an enlarged head at one end, positioning on the core against the head an annular close-fitting preformed working element of hard material such as tungsten carbide, then fitting a tubular spacing element of steel over the core against the tungsten carbide ring, and finally welding the coplanar extremities of both the core and the spacer to a coaxial supporting rod, the tungsten carbide ring being of greater external diameter than any of the other components.

Other objects and characterizing features of the invention will appear from the following detailed description of one embodiment thereof taken in connection with the accompanying drawing, in which:

Fig. 1 is a broken view in longitudinal central section of a tube drawing plug constructed in accordance with the invention and shown as coacting with a drawing die to draw a section of tubing;

Fig. 2 is a detached broken view of the completed plug;

Fig. 3 is a view in side elevation and partly in section of the component elements prepared for welding;

Fig. 4 is a detached view in side elevation of the core element of the plug;

Fig. 5 is a view thereof in right-hand end elevation;

Fig. 6 is a detached view in side elevation of the working element;

Fig. 7 is a view thereof in right-hand end elevation;

Fig. 8 is a detached view in side elevation and partly in central longitudinal section of the tubular spacing element;

Fig. 9 is a view thereof in right-hand end elevation; and

Fig. 10 is a view similar to Fig. 2 of a modified form of tool.

In practicing the invention as herein disclosed, a cylindrical core element 20 of tough steel alloy having an enlarged coaxial head 21 at one end forming an annular shoulder 22 is assembled with a close-fitting annular working element 30 of much harder material such as tungsten carbide, which is driven into contact with the shoulder 22. A close-fitting spacing sleeve 40 is then driven over the core 20 until its end contacts the element 30 which is then held firmly between the end of the spacer 40 and the shoulder 22.

This assembled group is then axially aligned with the corresponding end of a rod-like supporting member 50 as shown in Fig. 3 and then is welded thereto as shown in Fig. 2.

The core 20 may be formed at the juncture of its head and body portions with a circumferential fillet 23 to aid in preventing the starting of cracks from the juncture if sharp angled. In this case, the inner periphery of the juxtaposed end of the element 30 will be rounded over as at 31 to correspond.

The filler 40 is of such dimensions that when the parts are assembled for welding as shown in Fig. 3, the left-hand ends of the core 20 and filler 40 will be substantially coplanar or flush with each other as shown. The left-hand end of the filler 40 is preferably chamfered or beveled on its inner periphery as at 41 to provide space for the softened end of the core 20 to expand into during the welding, thus locking the sleeve 40 rigidly in place.

Material forced out from the sleeve 40 and rod 50 during the welded as at 51 may be removed subsequently to the welding.

Fig. 10 shows a punching tool for punch presses or the like, the head 21 in this case being countersunk into the working element 30.

It will be plain that the support 50 need not be larger in diameter than the abutted end of the core 20 if only care be taken that the sleeve 40 be welded to the core 20 as well as the latter to the support 50. In this case the sleeve 40 may be additionally spot welded elsewhere also to the core 20.

The parts are preferably so proportioned that sufficient heat to injure the working element 30 will not be conducted thereto during the welding operation.

It is evident that the invention enables the making of a tool of the character described which is substantially a single integral unit. The components cannot work loose and hence chatter or even break as is frequently the case when they are held together by screw threads or similar mechanical joining.

The embodiments of the invention above disclosed are merely illustrative and may evidently be modified and departed from in many ways without departing from the spirit and scope of the invention as pointed out in and limited only by the appended claims.

I claim:

1. As a new article of manufacture, a tube-forming plug designed to be subjected to heavy tension comprising a support member, a core member having a shoulder thereon, a tubular working member positioned on the core member abutting the shoulder, and a spacing sleeve also positioned on the core member between the working member and the support member, the support member being welded to the core member and to the spacing sleeve.

2. As a new article of manufacture, a tube-forming plug designed to be subjected to heavy tension comprising a support member, a core member having a shoulder thereon, a tubular working member positioned on the core member abutting the shoulder, and a spacing sleeve also positioned on the core member between the working member and the support member, the support member being welded to the core member and to the spacing member, and the spacing sleeve being also welded to the core member.

3. The method of forming a tube-forming plug designed to be subjected to heavy tension which comprises the steps of preforming a shouldered core, a tubular working member adapted to fit thereon against the shoulder, and a spacer sleeve adapted to fit on the core against the working member; then assembling the core, working member and sleeve; and then welding the sleeve and the core to a coaxial supporting-member.

4. The method of forming a tool which comprises the steps of preforming a shouldered core, a tubular working member adapted to fit thereon against the shoulder, and a spacer sleeve adapted to fit on the core against the working member and with its end which is remote from the working member having its internal edge provided with an enlarging chamfer and with said remote end approximately flush with the adjacent end of the core when assembled, then assembling the core, working member and sleeve and then butt welding the sleeve and the core to a coaxial supporting-member.

5. The method of forming a tube-forming plug designed to be subjected to heavy tension which comprises the steps of preforming a shouldered core, a tubular working member adapted to fit thereon against the shoulder, and a spacer sleeve adapted to fit on the core against the working member and with its end which is remote from the working member having its internal edge provided with an enlarging chamfer and with said remote end approximately flush with the adjacent end of the core when assembled, then assembling the core, working member and sleeve and then butt welding the core to a coaxial supporting-member.

MICHAEL J. DEMPSEY.